US007782862B2

(12) United States Patent
Mooney et al.

(10) Patent No.: US 7,782,862 B2
(45) Date of Patent: Aug. 24, 2010

(54) METHOD FOR CONTROLLING PACKET DELIVERY IN A PACKET SWITCHED NETWORK

(75) Inventors: Christopher Francis Mooney, Livingston, NJ (US); Qinqing Zhang, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1195 days.

(21) Appl. No.: 11/332,761

(22) Filed: Jan. 13, 2006

(65) Prior Publication Data

US 2007/0165643 A1 Jul. 19, 2007

(51) Int. Cl.
*H04L 12/56* (2006.01)

(52) U.S. Cl. .................... 370/394; 370/469; 370/474

(58) Field of Classification Search .............. 370/394, 370/474, 250, 252, 253, 328, 469, 476; 709/247; 714/748, 749

See application file for complete search history.

(56) References Cited

U.S. PATENT DOCUMENTS

| 5,648,970 A * | 7/1997 | Kapoor ...................... 370/394 |
| 6,011,796 A * | 1/2000 | Rezaiifar et al. ............ 370/394 |
| 6,658,004 B1 * | 12/2003 | Kadansky et al. ........... 370/394 |
| 7,061,913 B1 * | 6/2006 | Abrol et al. ................. 370/394 |
| 2002/0110095 A1 | 8/2002 | Jiang et al. ................. 370/328 |
| 2002/0131415 A1 * | 9/2002 | Guven et al. ................ 370/394 |
| 2003/0012200 A1 * | 1/2003 | Salamat ..................... 370/394 |
| 2003/0035441 A1 * | 2/2003 | Cheng et al. ................ 370/474 |
| 2003/0067920 A1 * | 4/2003 | Rezaiifar et al. ............ 370/394 |
| 2003/0095536 A1 * | 5/2003 | Hu et al. .................... 370/394 |
| 2003/0156599 A1 * | 8/2003 | Casaccia et al. ............ 370/474 |
| 2004/0100963 A1 | 5/2004 | Guo .......................... 370/394 |
| 2004/0100965 A1 * | 5/2004 | Proctor et al. .............. 370/394 |
| 2005/0180371 A1 | 8/2005 | Malkamaki ................. 370/342 |
| 2006/0120352 A1 * | 6/2006 | Agashe et al. .............. 370/352 |
| 2006/0285500 A1 * | 12/2006 | Booth et al. ................ 370/250 |
| 2007/0070937 A1 * | 3/2007 | Demirhan et al. ........... 370/328 |

OTHER PUBLICATIONS

PCT/US2007/000641, Jun. 27, 2007, PCT Search Report.

* cited by examiner

*Primary Examiner*—Kwang B Yao
*Assistant Examiner*—Jeffrey M Rutkowski
(74) *Attorney, Agent, or Firm*—John Ligon

(57) ABSTRACT

A method is provided for controlling the misordering of packets in packet delivery in radio access networks (RANs) and other packet-switched networks. In one aspect, the method involves reading header information to determine the proper sequence of arriving packets, storing at least some packets that have arrived out of order, and forwarding the stored packets in a modified order that has no more than a specified degree of misordering.

9 Claims, 4 Drawing Sheets

Packet out of order delivery with controlled degree of out-of-order p.

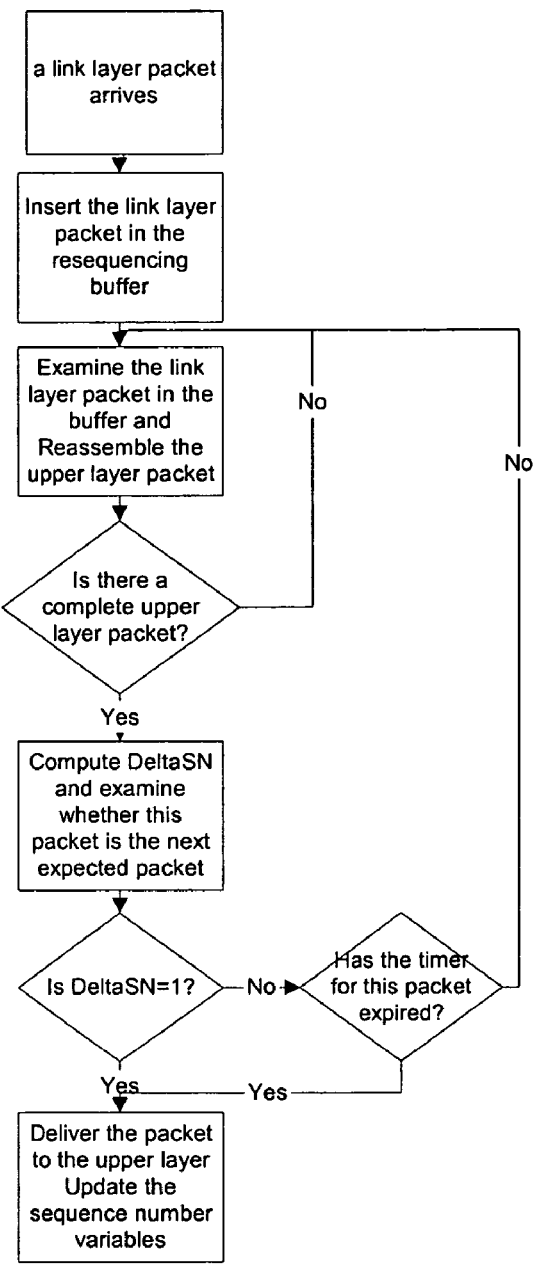
Figure 1 Packet in order delivery

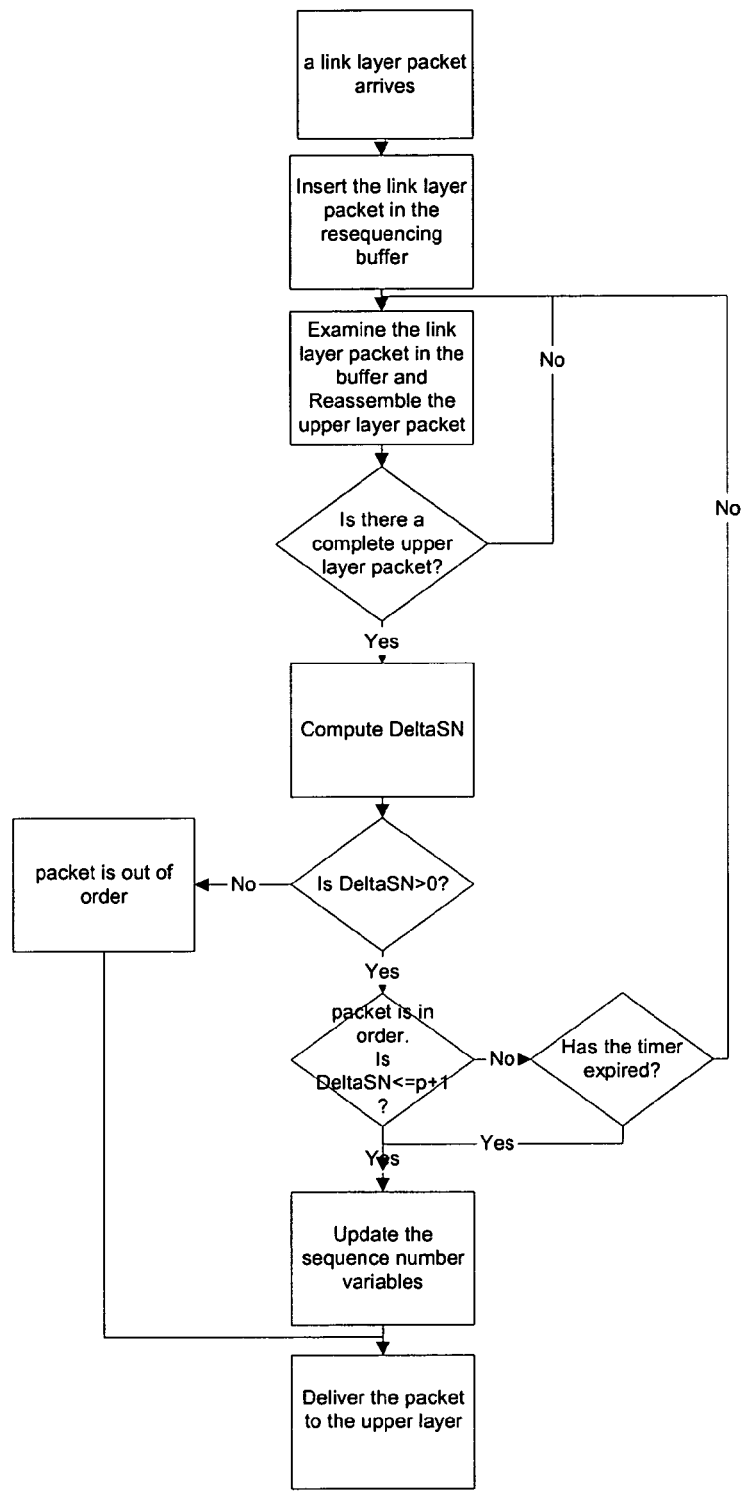
Figure 2 Packet out of order delivery with controlled degree of out-of-order p.

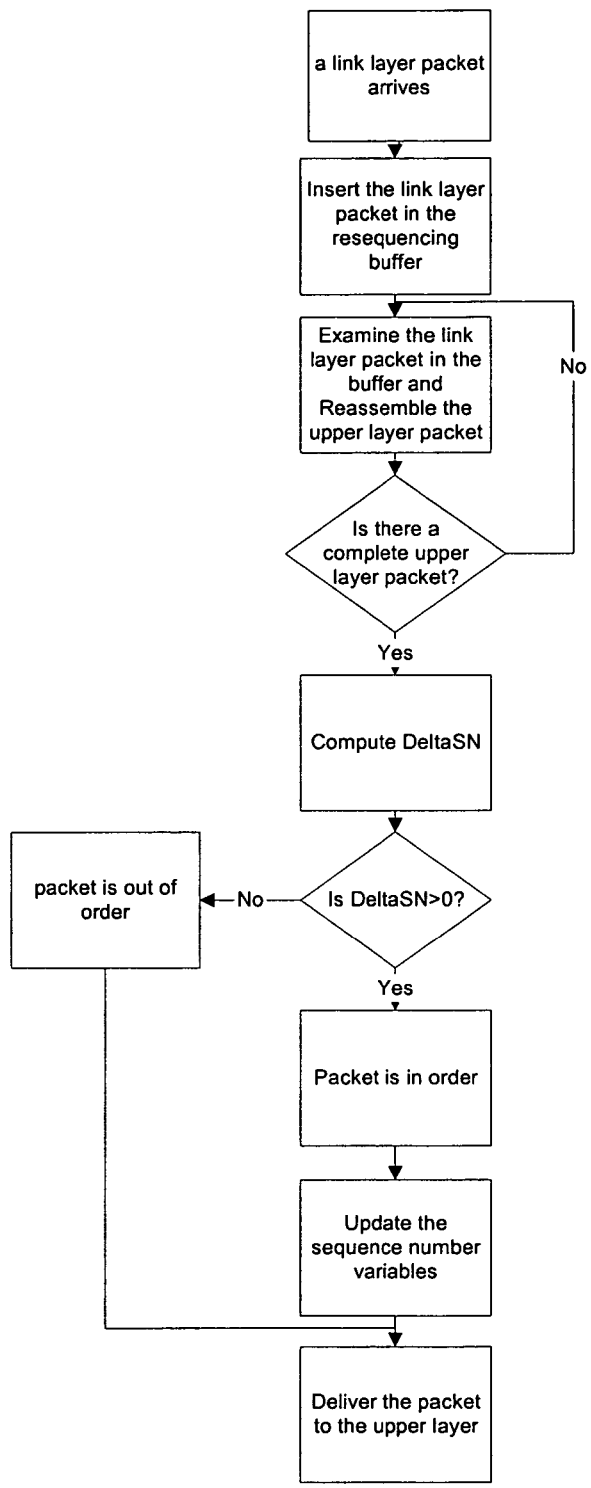
Figure 3 Packet out of order delivery without controlled degree of out of order.

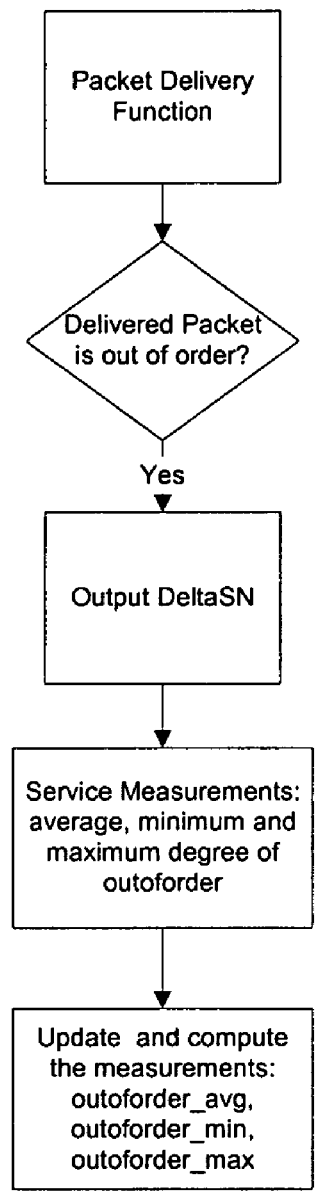
Figure 4 Measurement of packet out of order delivery

METHOD FOR CONTROLLING PACKET DELIVERY IN A PACKET SWITCHED NETWORK

FIELD OF THE INVENTION

This invention relates to packet-switched networks, and more particularly to controlling the order of packet delivery in such networks.

ART BACKGROUND

Several factors may cause packets to be delivered out of order in packet-switched networks. For example, a Radio Access Network (RAN) is a packet-switched network which includes an air interface and a backhaul connection. Packet retransmission over the air interface may cause packets to arrive out of order. In another example, load balancing across multiple T1/E1 lines or other interfaces over the backhaul may cause packets to be delivered over multiple connections, and for that reason to arrive out of order.

It is often preferable to have in-order packet delivery in a packet network, since the user application layer typically needs to receive the packets in sequence to correctly decode the packet stream. This is realized by using the packet sequence number to reorder the packets.

In a network description which follows a layering model, reordering can be applied at different layers. A lower layer uses the sequence numbers of its own data units, e.g., packets, to re-sequence and reassemble the upper-layer packet which is to be delivered. However, reordering typically involves the use of a buffer to store the early-arrived packets and wait for the late-arrived packets so that the packets can be re-sequenced. This buffering introduces extra delay and is not desirable for delay-sensitive applications. If, on the other hand, the upper layer could handle out-of-order packets, it might be possible to skip the reordering operation at the lower layer, and thus to avoid the extra buffering delay.

Furthermore, end-to-end transmissions often involve multiple segments and individually controlled networks. Packets may get out of order in any of the transmission paths. Reordering in one network segment does not guarantee that the packets will be delivered in sequence to the final destination. However, if each network segment performed a reordering operation, the cumulative effect could be to introduce an excessive amount of extra delay. Such a result would be particularly undesirable for multimedia applications, which are delay sensitive.

For the above reasons, among others, it would be advantageous for a packet network, especially one highly sensitive to overall end-to-end delay, to support out-of-order delivery of packets.

It would be even more advantageous if the degree of packet out-of-order delivery could be controlled. That is, the processing of packets in upper layers may be tolerant to greater or lesser amounts of misordering of packets. In this regard, "upper" is in relation to a layer, such as the IP layer, in which a certain amount of misordering is tolerated. By "misordering" is meant the arrival of a packet of higher sequential number prior to the arrival of a packet of lower sequential number. Thus, it would be advantageous to control the amount of misordering so that it lies within a tolerable range.

For example, the header compression layer may be able to handle late-arriving packets. It could be possible for the decompressor to successfully decode a packet arriving late with a sequence number smaller than that of the previously decoded packet. But if the packet arrived too late, the decompressor might be unable to decode the packet, and thus would declare a decompression failure and be required to discard the packet.

By way of illustration, we assume that the decompressor can handle packets misordered to the fifth degree. The decompressor receives packets 5, 1, 10, 2. The decompressor decodes packet 5 and then packet 1 since the degree of misorder is 4. The decompressor cannot decode 2 since its degree of misorder is 8, which is above the tolerance the compressor can handle. Packet 2 will be discarded although it is correctly received.

Thus, it would be advantageous to support both packet in-order delivery and out-of-order delivery in a packet network. It would be still more advantageous to control the degree of misorder of delivered packets based on system requirements and tolerance to packet misorder.

SUMMARY OF THE INVENTION

We have developed a method for controlling the misordering of packets in packet delivery in radio access networks (RANs) and other packet-switched networks.

In a broad aspect, our method involves reading header information to determine the proper sequence of arriving packets, storing at least some packets that have arrived out of order, and forwarding the stored packets in a modified order that has no more than a specified degree of misordering.

BRIEF DESCRIPTION OF THE DRAWING

FIG. 1 is a flowchart of an illustrative algorithm for delivering packets in order.

FIG. 2 is a flowchart of an illustrative algorithm for delivering packets with a controlled degree of misordering.

FIG. 3 is a flowchart of an illustrative algorithm for delivering packets with an uncontrolled degree of misordering.

FIG. 4 is a flowchart of an illustrative algorithm for measuring the degree of packet misordering.

DETAILED DESCRIPTION

For purposes of illustration, the invention will be described in an exemplary embodiment for Radio Access Networks (RANs). It will be appreciated that similar principles may be applied in other packet-switched networks, both wireless and wireline, without departing from the scope and spirit of the invention.

In RAN, the radio link protocol (RLP) processes radio link packets are communicated between the access terminal (AT) and the radio network controller (RNC). The RLP layer uses the RLP sequence number for packet transmission and delivery. The RLP reassembles the upper-layer packet from one or more multiple RLP packet payloads and delivers it to the upper layer.

The RLP layer can fragment an upper-layer packet into multiple RLP packets. If RLP does not fragment the upper-layer packet, the RLP packet consists of one upper-layer packet. The boundary of the upper-layer packet in the RLP packet payload is indicated by two flags, namely, "FirstDataUnit", and "LastDataUnit", in the RLP header fields.

If the "FirstDataUnit" is set to 1, it indicates that the RLP packet payload is the first data segment of an upper-layer packet. If the "LastDataUnit" is set to 1, it indicates that the payload is the last data segment of an upper-layer packet. If both flags are set to 1, it indicates that the payload is a complete upper-layer packet. If neither of the flags is set to 1, it indicates that the RLP packet payload in a middle data segment of an upper layer upper.

These "FirstDataUnit" and "LastDataUnit" flags facilitate the reassembly of an upper-layer packet by the RLP layer. An upper-layer packet is considered completed if either of the following conditions is met:
1. If the received RLP packet has both the First and Last DataUnit flags are set in the received RLP packet.
2. The upper-layer packet has been fragmented by RLP, the resulting multiplicity of RLP packets has been received with contiguous sequence numbers, the packet with the lowest relative sequence number has the FirstDataUnit flag set, and the packet with the highest relative sequence number has the LastDataUnit flag set.

An upper-layer packet is considered a partial packet if the following condition is met:
1. The upper-layer packet has been fragmented by RLP, a resulting multiplicity of RLP packets has been received, the packet with the lowest relative sequence number has the FirstDataUnit flag set, the packet with the highest relative sequence number has the LastDataUnit flag set, but there is a gap in the sequence numbers among the received packets; or else, there is an indication that the missing RLP packets which carry the upper layer fragment are lost or erroneous in transmission.

For packet in-order delivery, the RLP layer performs re-sequencing and delivers the upper-layer packets in order. This is achieved by the RLP layer buffering the received RLP packet, examining its sequence number, and reassembling an upper-layer packet. If RLP detects a packet received in error, it discards the packet and advances the expected RLP sequence number (SN) of the next delivered packet. If a RLP packet is lost in transmission, the acknowledgement timer for this packet will be expired and the RLP layer advances the expected SN of the next delivered packet.

For packet out-of-sequence delivery, the RLP can deliver upper-layer packets out of sequence. In other words, the RLP packets which constitute an upper-layer packet are always delivered in order. But the upper-layer packet delivered by RLP might be delivered out of sequence.

If an upper-layer packet is encapsulated in a single RLP packet, the RLP layer can deliver the upper-layer packet immediately upon receiving a RLP packet which has a gap in the sequence number from the previously received RLP packet. If the upper-layer packet is fragmented into multiple RLP packets, however, the RLP layer will need to wait for all the data segments to arrive so that it can assemble a complete or partial upper-layer packet. In that case, the RLP packets constituting the upper-layer packet will be reordered properly. However, as noted, different upper-layer packets might be delivered out of order.

The algorithms for packet delivery are illustrated as follows. The RLP layer maintains four sequence number (SN) registers or variables:
1. SN_previous_last: the SN of the RLP packet delivered to upper layer which is the last segment (LastDataUnit set as 1).
2. SN_previous_first: the SN of the RLP packet delivered to upper layer which is the first segment (FirstDataUnit set as 1)
3. SN_current_last: the SN of the RLP packet ready to be delivered to upper layer which is the last segment (LastDataUnit set as 1).
4. SN_current_first: the SN of the RLP packet ready to be delivered to upper layer which is the first segment (FirstDataUnit set as 1)

That is, the registers listed above will respectively maintain the RLP sequence numbers of: The last-delivered terminal segment of an upper-layer packet, the last-delivered initial segment of an upper-layer packet, the terminal segment next awaiting delivery, and the initial segment next awaiting delivery.

Algorithm for Packet In-Order Delivery (FIG. 1):

Step 1: Compute DeltaSN=SN_current_first−SN_previous_last

Step 2: If DeltaSN=1, packet is contiguous.
Update SN_previous_first and SN_previous_last variables:
SN_previous_first=SN_current_first;
SN_previous_last=SN_current_last;
Deliver the packet to the upper layer.

Step 3: If DeltaSN>1, packet is not contiguous,
Store the packet in the buffer in the increasing order according to its SN number. Start the timer.
Examine the timer for packets stayed in the buffer.
If the timer expires, deliver the complete or partial packet to the upper layer.
Update SN_previous_first and SN_previous_last variables:
SN_previous_first=SN_current_first;
SN_previous_last=SN_current_last;

For packet out-of-order delivery, the RAN can control the degree of misordered delivery by performing partial re-sequencing of the received packets. In other words, the RLP layer may still deliver the upper-layer packets out of sequence, but the degree of misordering is controlled by a configurable parameter p. For example, if the desired degree p of misordering is 4, the RLP is directed to deliver a pair of packets out of order only if they are out of sequence by 4 places or less.

Thus, one advantage of the method described here is that upper-layer packets can be delivered out of order, but with a controlled amount of misordering. Moreover, the configurable parameter p can be applied not only to upper-layer packets, but also to lower-layer packets such as RLP packets.

That is, the parameter p can be directly defined and controlled as, e.g., the degree of RLP packet misordering. If, moreover, each upper-layer packet is encapsulated into exactly one RLP packet, then p will also indicate the maximum possible degree of misordering of upper-layer packets.

Accordingly, the degree of upper-layer packet misordering can be controlled by directly controlling the degree of RLP (or other lower-layer) packet misordering. For example, suppose that all upper layer packets have the same size, which is equivalent to q RLP packets. Suppose further that the desired degree of upper layer packet misordering is p, and that each upper layer packet encapsulates q RLP packets. In such a case, the degree of RLP packet misordering should be limited by p*q.

In a further example, suppose that as above, the desired degree of upper layer packet misordering is p, but the upper-layer packets encapsulate a variable number of RLP packets which is not less than q. In that case, the degree of RLP packet misordering is advantageously limited by p*q to plan for the smallest possible upper-layer packets.

By way of illustration, we suppose the received complete upper-layer packets are sequenced 1, 7, 2, 3. (For simplicity, we here assume that an upper-layer packet is not fragmented into multiple RLP packets.) The RLP delivers packet 1 first, then holds packet 7. If packet 7 is delivered, then packet 2 arrives late and the degree of misordering is 5. (I.e., 7−2=5.) A degree of 5 is above the maximum degree permitted by the RLP.

In this example, the RLP will hold packet 7 and wait for the late-arriving packets. When it receives packet 2, the RLP will deliver packets 2 and 7 in order, since transmitting them out of order would violate the condition that the maximum degree of misordering can be no more than 4. When packet 3 arrives later, the RLP will deliver packet 3. In this case, the RLP will deliver the upper-layer packets in the order: 1, 2, 7, 3, which guarantees the maximum degree of misordering to be 4.

Algorithm: Packet Out-of-sequence Delivery with Controllable Degree of p (FIG. 2):
Step 1: Compute DeltaSN=(SN_current_first−SN_previous_last)/q, where q is the minimum number of RLP packets corresponding to an upper layer packet. (If an upper layer packet is encapsulated into one RLP packet, q=1.)
Step 2: If DeltaSN>0, packet is in sequence
  If DeltaSN<=p+1, the gap in SN will not cause misordering larger than p.
    Deliver the upper-layer packet.
    Update SN_previous_first and SN_previous_last variables:
      SN_previous_first=SN_current_first
      SN_previous_last=SN_current_last
  If DeltaSN>p+1, the gap in SN may cause misordering larger than p.
    Store the packet in the buffer in increasing order according to the SNs. Start the timer.
    Go to Step 3.
Step 3: If DeltaSN<0, packets are out of order.
  Deliver the upper-layer packet.
  Do not need to update SN_previous_first and SN_previous_last since the current SN values are smaller than the previous ones.
Step 4: If there are packets of sequence number SN_lost detected to be lost or discarded, compute
DeltaSN=(SN_current_first−SN_lost)/q
Go to Step 2.
Examine the timer for the stored packets in the buffer.
If the timer expires, deliver the upper-layer packet.
Update SN_previous_first and SN_previous_last variables:
  SN_previous_first=SN_current_first
  SN_previous_last=SN_current_last Algorithm: Packet Out-of-sequence Delivery, No Control of the Maximum Degree of Misordering (FIG. 3):
Step 1: Compute DeltaSN=(SN_current_first−SN_previous_last)/q, where q is the minimum number of RLP packets corresponding to an upper layer packet. If an upper layer packet is encapsulated into 1 mRLP packet, q=1.
Step 2: If DeltaSN>0, packet is in sequence
  Deliver the upper-layer packet.
  Update SN_previous_first and SN_previous_last variables:
    SN_previous_first=SN_current_first
    SN_previous_last=SN_current_last
Step 3: If DeltaSN<0, packets are out of sequence.
  Deliver the upper-layer packet.
  Do not need to update SN_previous_first and SN_previous_last since the current SN values are smaller than the previous ones.

By way of illustration, suppose the received RLP SNs are: 1, 5, 3, 4, 2. Assume that RLP 1, 2, 3 are segments of an upper layer packet (e.g., a route protocol packet), and RLP packets 4 and 5 are complete packets. Using packet out-of-sequence delivery with controllable p=4, the RLP layer will deliver: 5, 4, (1,2,3). In this case, the degree of misordering is 1, since 5−4=1 and 4−3=1.

In a further example, we suppose the received RLP SNs are: 1, 8, 2, 3, 4. Assume that RLP 2, 3 are segments of a route protocol packet, and RLP packets 1, 8 and 4 are complete packets. So the RLP layer will deliver: 1, (2,3), 8, 4. In this case, the degree of misordering is 4. If there is no control on the degree of misordering, the RLP layer will deliver 1, 8, (2,3), 4. In that case, the degree of misordering will be 5, since 8−3=5.

As illustrated in FIG. 4, the degree of packet misordering can be measured to obtain a statistical estimate of how much out-of-order delivery has actually been occurring in the system. The measurement can be done over a time interval, e.g., every hour or every 15 minutes. In the figure, the variable "outoforder" represents the measured degree of misordering. In at least some cases, it will be advantageous to keep track of the average, minimum and maximum degrees of misordering. These measurements can provide external means to indicate how much misordering has been occurring. Such knowledge can be used to facilitate system design and optimization.

What is claimed is:

1. A method, comprising:
receiving a plurality of lower-level packets having respective sequence numbers;
reconstituting the lower-level packets as upper-level packets, wherein one or more lower-level packets are constituents of each said upper-level packet; and
forwarding at least some of the upper-level packets for further processing, CHARACTERIZED BY:
from some of the sequence numbers, determining that the constituents of at least one upper-level packet have arrived ahead of sequence by an amount DeltaSN corresponding to more than one sequential position; and
delaying the forwarding of said at least one upper-level packet if DeltaSN exceeds a specified limit corresponding to more than one sequential position
wherein:
the amount DeltaSN is determined from a degree to which sequence numbers of lower-level packets are out of order; and
the specified limit is a limit on the amount by which the sequence number of an early-arriving lower-level packet exceeds the sequence number of the next-arriving lower-level packet.

2. The method of claim 1, wherein:
while at least one said upper-level packet is being delayed, one or more upper-level packets which are sequentially precedent to the delayed packet are reconstituted and forwarded, thereby to partially reorder the forwarded upper-level packets.

3. The method of claim 2, wherein:
the forwarding of one or more sequentially precedent upper-level packets during the delay causes DeltaSN to decrease; and
the delayed upper-level packet is forwarded when DeltaSN falls to the specified limit.

4. The method of claim 2, wherein:
the forwarding of one or more sequentially precedent upper-level packets during the delay causes DeltaSN to decrease; and
the delayed upper-level packet is forwarded upon the occurrence of the earlier of: (a) when DeltaSN falls to the specified limit, or (b) a specified ceiling on the delay is reached.

5. The method of claim 1, wherein:
the upper-level packets have a maximum permissible degree of misordering, referred to as p; and
the specified limit is set to a number of lower-level packets that may collectively constitute p upper-level packets.

6. The method of claim 5, wherein all of the upper-level packets are constituted by the same number q of lower-level packets, and the specified limit is p×q.

7. The method of claim 5, wherein the upper-level packets are constituted by a variable number of lower-level packets which is at least q, and the specified limit is p×q.

8. The method of claim 1, wherein the sequence number of a lower-level packet that has been identified as lost or discarded is taken into account so as to reduce the degree to which sequence numbers of lower-level packets are determined to be out of order.

9. The method of claim 1, further comprising measuring an amount of misordering in arriving packets and providing at least one statistical estimate of how much out-of-order packet delivery is occurring.

* * * * *